United States Patent
Hunnius et al.

(10) Patent No.: US 10,633,275 B2
(45) Date of Patent: Apr. 28, 2020

(54) DEVICE AND METHOD FOR COOLING A COMPONENT CONTACTING A GLASS MELT

(71) Applicant: SCHOTT AG, Mainz (DE)

(72) Inventors: Holger Hunnius, Mainz (DE); Reinhard Zintl, Marktredwitz (DE); Ludwig Dürsch, Mainz (DE)

(73) Assignee: SCHOTT AG, Mainz (DE)

( * ) Notice: Subject to any disclaimer, the term of this patent is extended or adjusted under 35 U.S.C. 154(b) by 191 days.

(21) Appl. No.: 15/860,040

(22) Filed: Jan. 2, 2018

(65) Prior Publication Data
US 2018/0215642 A1 Aug. 2, 2018

(30) Foreign Application Priority Data
Feb. 1, 2017 (DE) .................. 10 2017 201 611

(51) Int. Cl.
  *C03B 5/44* (2006.01)
  *C03B 5/20* (2006.01)
  *C03B 5/26* (2006.01)
  *C03B 11/12* (2006.01)
  *C03B 9/38* (2006.01)

(52) U.S. Cl.
  CPC .............. *C03B 5/44* (2013.01); *C03B 5/205* (2013.01); *C03B 5/265* (2013.01); *C03B 9/3825* (2013.01); *C03B 11/127* (2013.01); *Y02P 40/57* (2015.11)

(58) Field of Classification Search
  CPC ........... C03B 5/44; C03B 5/205; C03B 5/265; C03B 9/3825; C03B 11/127
  See application file for complete search history.

(56) References Cited

U.S. PATENT DOCUMENTS

| 1,679,295 A | 7/1928 | Dodge |
| 2,068,925 A | 1/1937 | Mulholland |
| 3,241,941 A | 3/1966 | Abbott |
| 3,244,498 A | 4/1966 | Green |
| (Continued) | | |

FOREIGN PATENT DOCUMENTS

| DE | 669744 | 1/1939 |
| DE | 1034823 | 7/1958 |
| (Continued) | | |

*Primary Examiner* — Queenie S Dehghan
(74) *Attorney, Agent, or Firm* — Ohlandt, Greeley, Ruggiero & Perle, L.L.P.

(57) ABSTRACT

The present disclosure relates to a method for cooling a component of a glass melting plant that contacts a glass melt, the corresponding cooling device, as well as the system of the cooling device and the cooled component itself. The method provides that a pipe with an open pipe end at least on one pipe section is introduced into an open cavity in the component with the formation of a peripheral annular space, and a cooling medium is introduced through the pipe into the cavity and is deflected at the base of the cavity, flows back in the annular space, and flows out of the cavity. In its pipe section introduced into the cavity, the pipe has a constriction and has perforations through the pipe walls in the region of the constriction, whereby the cooling medium is accelerated in its passage through the constriction in the inside of the pipe, and a portion of the cooling medium flowing back from the annular space is aspirated into the inside of the pipe.

7 Claims, 8 Drawing Sheets

(56) References Cited

U.S. PATENT DOCUMENTS

2004/0099009 A1   5/2004  Linz
2014/0103570 A1*  4/2014  Stewart .................. B29C 48/06
                                                      264/211.13

FOREIGN PATENT DOCUMENTS

DE          10236521        2/2004
DE        102010037437      3/2012
EP           1607597 A1 *  12/2005   .......... F01N 13/1811
WO          03072515        9/2003

* cited by examiner x-axis = Blower throughput in m³/h; y-axis: Temperature in °C
oben = top; Bauart = Construction type; Abstand [mm] = Distance [mm]

x-axis = Blower throughput in m³/h; y-axis: Temperature in °C
oben = top; Bauart = Construction type; Abstand [mm] = Distance [mm]

x-axis = Blower throughput in m³/h; y-axis: Temperature in °C

Seite unten = side, bottom; Bauart = Construction type; Abstand [mm] = Distance [mm]

DEVICE AND METHOD FOR COOLING A COMPONENT CONTACTING A GLASS MELT

CROSS-REFERENCE TO RELATED APPLICATIONS

The present application claims the benefit of German Patent Application No. 10 2017 201 611.6, filed on Jan. 2, 2017, which is herein incorporated by reference.

BACKGROUND OF THE DISCLOSURE

1. Field of the Disclosure

The present disclosure relates to a method for cooling a component of a glass melting plant that guides or contacts a glass melt, the corresponding cooling device, as well as the system of the cooling device and the cooled component itself.

2. Summary of the Related Art

The component of a glass melting plant is usually composed of one or a plurality of blocks of a refractory material. Refractory material is known for the fact that it withstands the high temperatures and chemically aggressive atmosphere of the glass melt. Nevertheless, over time, wear occurs due to the dissolution of the refractory material in the glass melt, which takes place more intensely the higher the thermal load to which the component is subjected simultaneously.

For example, in melting and/or refining tanks, overflow and bridge walls are known, which inhibit the flow of specific layers in the glass melt in a targeted manner, promote the glass reduction of other layers, and in general influence the residence time of the melt in the melt/refining tank. At exposed places in such components, the flow rate of the glass melt increases regularly, so that transport processes that are also responsible for corrosion are accelerated there. If such a component is too greatly corroded after a specified operating time, it can no longer fulfill its designated function and must therefore be replaced. Overflow and bridge walls are named here only by way of example; other components that influence the flow, including the bottom or the walls of the tank, also can be affected by the described problem.

It is not possible, of course, to replace such components when a glass melting plant is in operation. The plant must first be shut down in order to be able to carry out the necessary maintenance and repair work. This is a costly procedure, for which reason one attempts to prolong the service life of such a glass melting plant and the individual components therein as long as possible.

Furthermore, the wear of refractory material also always means that foreign particles are entrained into the glass melt and frequently dissolve in the melt with the formation of gas bubbles. These bubbles can negatively affect the quality of the glass. For this reason, one tries to minimize refractory corrosion.

It has been established that the corrosion can be minimized by cooling the components. Thus, for example, described in the document U.S. Pat. No. 3,244,498 is a bridge wall that separates the melting zone of a melting tank from the refining zone of the melting tank, by permitting the glass to flow from one to the other zone through two defined openings. This bridge wall is constructed of several blocks of refractory material and forms an (open) cavity accessible from the bottom of the melting tank. Several pipelines are found in the cavity, through which air, as a cooling medium, flows into the cavity and in this way actively cools the bridge wall from its bottom.

Proceeding therefrom, the object of the present disclosure is to improve the method for cooling a component that guides or contacts a glass melt, the cooling device corresponding thereto, and the system of the cooling device and the cooled component itself, in order to reduce the problems described above that lead to the material wear.

SUMMARY OF THE DISCLOSURE

The method for cooling a component of a glass melting plant, where the component guides or contacts a glass melt, and has at least one open cavity, provides that a pipe with an open end at least on one section of the pipe is introduced into the cavity in the component with the formation of a peripheral annular space between the outer surface of the pipe and the inner surface of the cavity, and while maintaining an axial distance S between the end of the pipe and the base of the cavity. During the operation of the glass melting plant, a cooling medium is introduced into the cavity through the pipe and is deflected at the base of the cavity, flows back in the annular space, and flows out of the cavity. The method is further developed according to the present disclosure in that the pipe has a constriction in its section introduced into the cavity, and has perforations through the pipe walls in the region of the constriction, whereby the cooling medium is accelerated in its passage through the constriction in the inside of the pipe, and a portion of the cooling medium flowing back from the annular space is aspirated into the inside of the pipe.

The cooling device according to the present disclosure, for the cooling of a component of a glass melting plant that guides or contacts a glass melt, accordingly provides a pipe that can be introduced in section into an open cavity in the component, this pipe having an open pipe end and a flow generator fluidically joined to the pipe for generating a flow of cooling medium, wherein at least by one section of the pipe, the latter can be introduced into the cavity in the component with the formation of a peripheral annular space between the outer surface of the pipe and the inner surface of the cavity and while maintaining an axial distance S between the end of the pipe and the base of the cavity, wherein the pipe has a constriction in its section introduced into the cavity, and has perforations through the pipe walls in the region of the constriction.

The system according to the present disclosure completes the cooling device by a component of a glass melting plant that guides a glass melt and that has at least one open cavity, wherein the pipe of the cooling device with its pipe section that can be introduced into the cavity is introduced with the formation of a peripheral annular space between the outer surface of the pipe and the inner surface of the cavity and while maintaining an axial distance S between the end of the pipe and the base of the cavity.

Definitions

An "open cavity" is understood to be a cavity in the component that is accessible through an opening from at least one side. It goes without saying that the opening is found on a side of the component that faces away from the glass melt during the operation of the glass melting plant. A "constriction" very generally denotes a local cross-sectional tapering of the pipe. The constriction may extend over the entire periphery or over one or more partial regions (angular sections) of the periphery. It may be formed, for example, by an increase in the wall thickness on the inside of the pipe or a reshaping of the pipe walls in order to achieve a concave belly shape (necking). The "region of the constriction" describes the entire lengthwise section of the pipe, in which the cross section is tapered in comparison to a uniform initial cross section of the pipe. To be distinguished therefrom is the pipe section that "can be introduced" or is "introduced" and that is radially surrounded by the component in the intended state of use. The open front end of the pipe section that can be introduced/is introduced is designated as the "pipe end" or "end of the pipe". The region of the constriction is usually a partial section of the pipe section that can be introduced/is introduced and that is arranged in the axial direction preferably at the end of the pipe, adjoining or at least closer to the pipe end than to the opening of the cavity. The "pipe" is not limited to a specific cross-sectional shape; however, it is preferably circular-round. In this case, in the simplest configuration, the pipe is configured as cylindrical except in the region of the constriction, and preferably also has a predominantly circular-round cross section in the region of the constriction. More preferably, it also has a circular-shaped cross section at the narrowest place of the constriction. A similar situation applies to the cavity, the cross section of which, as is known from the document U.S. Pat. No. 3,244,498, can be, for example, square or preferably circular-round, if the cavity is designed, for example, as a blind hole. Correspondingly, the peripheral annular space that is formed between the outer surface of the pipe and the inner surface of the cavity need not necessarily be shaped as circular, but this is preferred. The pipe is arranged preferably centrally in the cavity, and, in particular, the cylindrical pipe is concentrically arranged in such a blind hole, even though the present disclosure does not exclude an eccentric arrangement.

The component guiding a glass melt is usually formed from refractory material and, for example, forms an overflow wall or a bridge wall or a through-flow opening or another wall or bottom section of a glass melting plant.

As is known, the flow rate increases in a constricted region of a pipe through which media pass and the stationary pressure at the same place decreases proportionally to the square of the rate increase (Bernoulli equation). This physical law is utilized, for example, in a Venturi tube or a Venturi nozzle for mixing different media, a first medium of which flows through the tube and a second medium of which is introduced or is aspirated through a takeout pipe that is attached laterally in the region of the constriction.

The present disclosure now makes use of this principle for the first time for the improved cooling of a component that guides a glass melt. In this case, not only is a cooling medium introduced from outside into the cavity through a pipe, but the medium is circulated inside the cavity based on the Venturi principle in such a way that the cooling power is improved at the air outlet of the pipe, thus at the open end of the pipe, in comparison to a conventional pipe. The improvement of the cooling power results from the increase in the flow rate due to the circulation of the cooling medium and the increase in the convection coefficient associated therewith. Since the end of the pipe, except for the axial distance S, reaches to the base of the cavity, this region of the component is optimally cooled. As a rule, this is also the site that is found closest to the thermally and mechanically most stressed places in the component, for example, the top or crown of an overflow or bridge wall. The improved cooling action effectively counteracts any corrosion of the material right here.

The dimensioning of the pipe and the cavity and the wall distances resulting therefrom, as well as the number of cavities and the pipe sections used is oriented, on the one hand, to the quantity of heat to be removed and, on the other hand, to the lowest possible operating costs of the melting plant. With respect to operating costs, a requirement for small quantities of coolant (gas/air) at the lowest possible pressure is of advantage. Therefore, flow cross sections of the cooling device according to the present disclosure or of the system according to the present disclosure are preferably selected for sections in which a cooling will not be achieved in such a way that during operation, a pressure loss that is as small as possible is present in order to minimize operating costs. In the flow sections in which the cooling shall act, however, and heat shall be withdrawn locally from the melting plant or the fittings thereof, an excessive flow rate will be produced in a targeted manner and larger pressure losses are tolerated. The walls of the cavity described here represent a region with excessive flow rate. The following dimensions have been found to be advantageous from these viewpoints for the method according to the present disclosure, the device, and the system.

Preferably, except for in the region of the constriction, the pipe has an inner cross-sectional surface area $A_I$ and the cavity has a cross-sectional surface area $A_H$ perpendicular to the pipe, i.e., to the pipe axis, wherein $A_H$ corresponds to 1.5 times to 4 times $A_I$. Constant hydraulic diameters are optimal in terms of flow dynamics, whereby the relationship $A_H = 4 \cdot A_I$ results for a cavity with circular cross section and a circular pipe. A halving of the surface area relationship to $A_H = 2 \cdot A_I$, in contrast, doubles the flow rate at the cavity walls, which leads to a good compromise between the operating costs of cooling and the cooling effect achieved. Down to a surface area relationship of $A_H = 1.5 \cdot A_I$, good cooling effects with acceptable operating conditions can be achieved. This relationship between the cross-sectional surface areas applies independently of the cross-sectional shapes of the pipe and the cavity.

If the pipe is configured cylindrically at least in sections and except in the region of the constriction, and it has an inner diameter $D_I$ on the cylindrical section, and if the cavity is designed as a blind hole with a diameter $D_H$, the following relation correspondingly preferably applies: $D_H = \sqrt{1.5} \cdot D_I$ to $2 \cdot D_I$ with an optimum at $D_H = \sqrt{2} \cdot D_I$.

In addition, except for the region of the constriction, the pipe preferably has an inner cross-sectional surface area $A_I$ and has an inner cross-sectional surface area $A_E$ at the narrowest place in the constriction, wherein the following condition is fulfilled: $A_E \geq 0.04 \cdot A_I$.

A minimum cross-sectional surface area of the pipe at the narrowest place in the constriction of $A_E = 0.04 \cdot A_I$ assures that in practice, the pressure loss remains at a tolerable level, so that the cooling can still be economically operated.

Preferably, the cavity has a cross-sectional surface area $A_H$ perpendicular to the pipe axis and a diameter $D_H = 2 \cdot \sqrt{A_H/\pi}$, wherein the distance S corresponds to 0.1 times to 0.8 times the cavity diameter $D_H$. The optimal relationship $S = 0.35 \cdot D_H$ results approximately from the requirement for a preferably constant flow cross section in the transition from the end of the pipe to the gap with the height S between the pipe end and the base of the cavity, and from there into the annular space ($A_H = 2 \cdot A_I$), wherein a cross-sectional surface area in the form of the extended jacket surface of the pipe and with the height of the axial distance S is assumed at the deflection point of the flow. However, in the entire region from $0.1 \cdot D_H$ to $0.8 \cdot D_H$, again, good cooling effects can be achieved with acceptable operating conditions.

And this condition also generally applies, thus independently from the cross-sectional shape of the cavity perpendicular to the pipe axis. $D_H$ thus in general designates an equivalent diameter, when the cavity does not have a circular-round cross section. If the latter is circular-round, for example, since the cavity is designed as a blind hole, $D_H$ is, of course, the real diameter. When nothing to the contrary is indicated, the same thing applies to the cross section of the pipe.

The cooling device is further developed in an advantageous manner in that the flow generator is a blower.

The system is further developed in an advantageous manner, in that the distance S is ≤35 mm, preferably S≤20 mm.

In addition, it has been found to be advantageous that the blind hole has a diameter $D_H$ of 40-80 mm, more preferably 50-75 mm.

The pipe preferably has an inner diameter $D_I$ of 30-60 mm, more preferably 40-50 mm, on its pipe section that can be introduced into the blind hole, except in the region of the constriction.

DETAILED DESCRIPTION OF THE DISCLOSURE

Figures 1A, 1B:
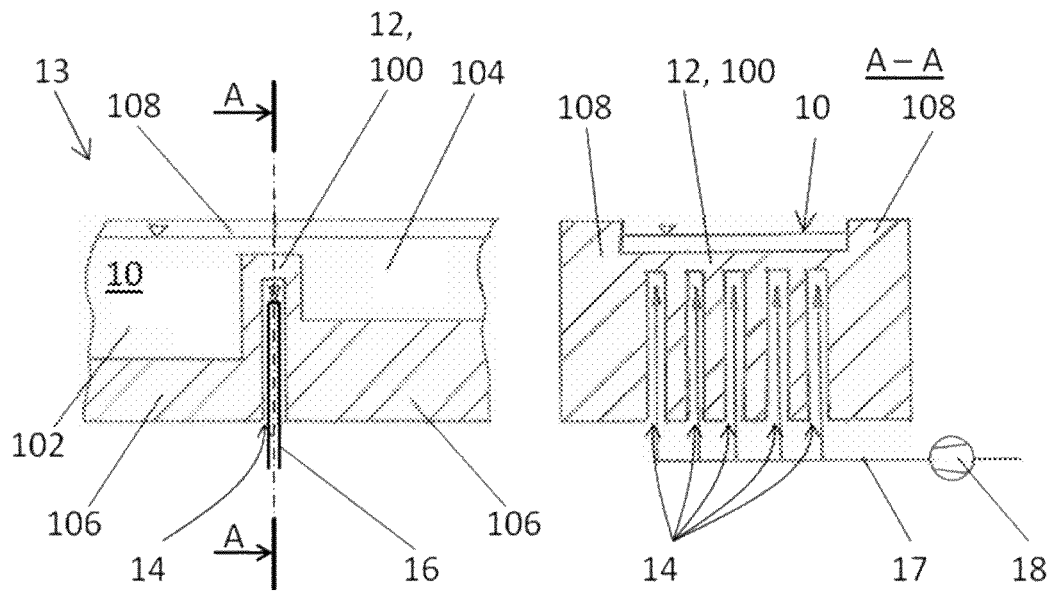
FIGS. 1a and 1b show a first embodiment of the system according to the present disclosure in the form of a cooled overflow wall.

In two views, FIGS. 1a and 1b show a first embodiment of the system according to the present disclosure with a component 12 that guides or contacts a glass melt 10. FIG. 1a shows a sectioned lateral view, in which it can be recognized that the component 12 forms an overflow wall 100 that divides a melting tank or glass melting plant 13 into two sections 102 and 104. The melting tank 13 is bounded by a tank bottom 106 and side walls 108, which are in contact with the melt 10, as is overflow wall 100 also, and thus these are usually formed from refractory stone. From the bottom 106 of the tank, the overflow wall 100 projects up to just below the glass surface. In other words, the melt 10 covers the overflow wall on its upper side or top, the so-called wall crown. At this place, the melt has the highest flow rate within the melting tank, for which reason, the refractory material at the wall crown is subjected to the greatest wear. Therefore, one attempts to achieve a cooling that is as effective as possible at precisely this place.

For this purpose, the component 12 has a total of five cavities 14 open from the bottom lying opposite to the wall crown. As can be recognized in the sectioned front view 1b, the cavities are distributed equidistantly over the entire width of the overflow wall 100. In each of the cavities 14 is introduced a separate pipe 16 (only shown in FIG. 1a by way of example), through which a cooling medium, in particular a gas, and more preferably air, is introduced into the cavity 14 during the operation of the glass melting plant 13. For this purpose, all pipes 16 are connected to a supply line 17, which is connected on the input side to a flow generator 18, preferably in the form of a blower. Furthermore, control elements that are not shown, such as, for example, a valve or throttles, or the like can be provided along the supply line 17 for control of the air flow that is introduced.

Figures 2A, 2B:
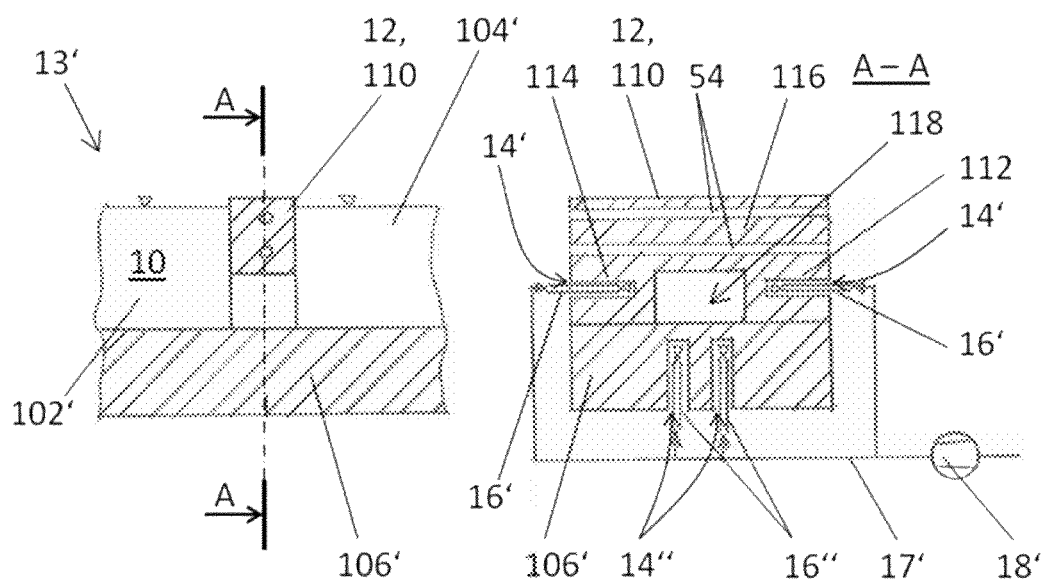
FIGS. 2a and 2b show a second embodiment of the system in the form of a cooled brick wall.

FIGS. 2a and 2b show two sectioned views of another embodiment of the system according to the present disclosure. The component 12 here is a bridge wall, which once again divides the glass melting tank 13' into two sections 102' and 104'. With its two side parts 112, 114 and the cross beam 116, together with the bottom 106' of the tank, the bridge wall 110 forms a window 118, also called a throughflow opening, which is immersed in the melt 10 completely below the glass surface. The window 118 forms a cross-sectional constriction opposite the tank cross section, which increases the flow rate in this region. For this reason, an intensified wear of the refractory material ensues on all four sides of the window opening, i.e., on both side parts 112, 114, the cross beam 116 and the tank bottom 106'. Correspondingly, a cooling is provided here in all four sides of the component.

In each of the two side parts 112 and 114 of the bridge wall 110 is found for this purpose a cavity 14' in the form of a blind hole, and a pipe 16' is introduced into each of these holes. In an entirely similar manner, two openings 14" in the form of blind holes, into each of which is inserted a pipe 16", are found in the bottom wall 106'. Once again, the pipes 16' and 16" are supplied with air via a pipeline 17' and flow generator 18'.

The cross beam 116 has a different construction for the cooling in the form of two continuous boreholes 54 through which flows a cooling medium, preferably air, crosswise to the alignment of the tank, from one side to the other.

Both embodiment examples discussed in connection with FIGS. 1A, 1B and 2A, 2B are considered to be schematic with respect to the configuration, number and arrangement of the cavities or blind holes and pipes. In particular, depending on the cooling requirement in each case, more or fewer cavities and pipes can be provided, also in different configuration and size and in another arrangement. The details of the cavity 14 and of the pipe 16 are explained below on the basis of FIGS. 3 to 5.

Figure 3:
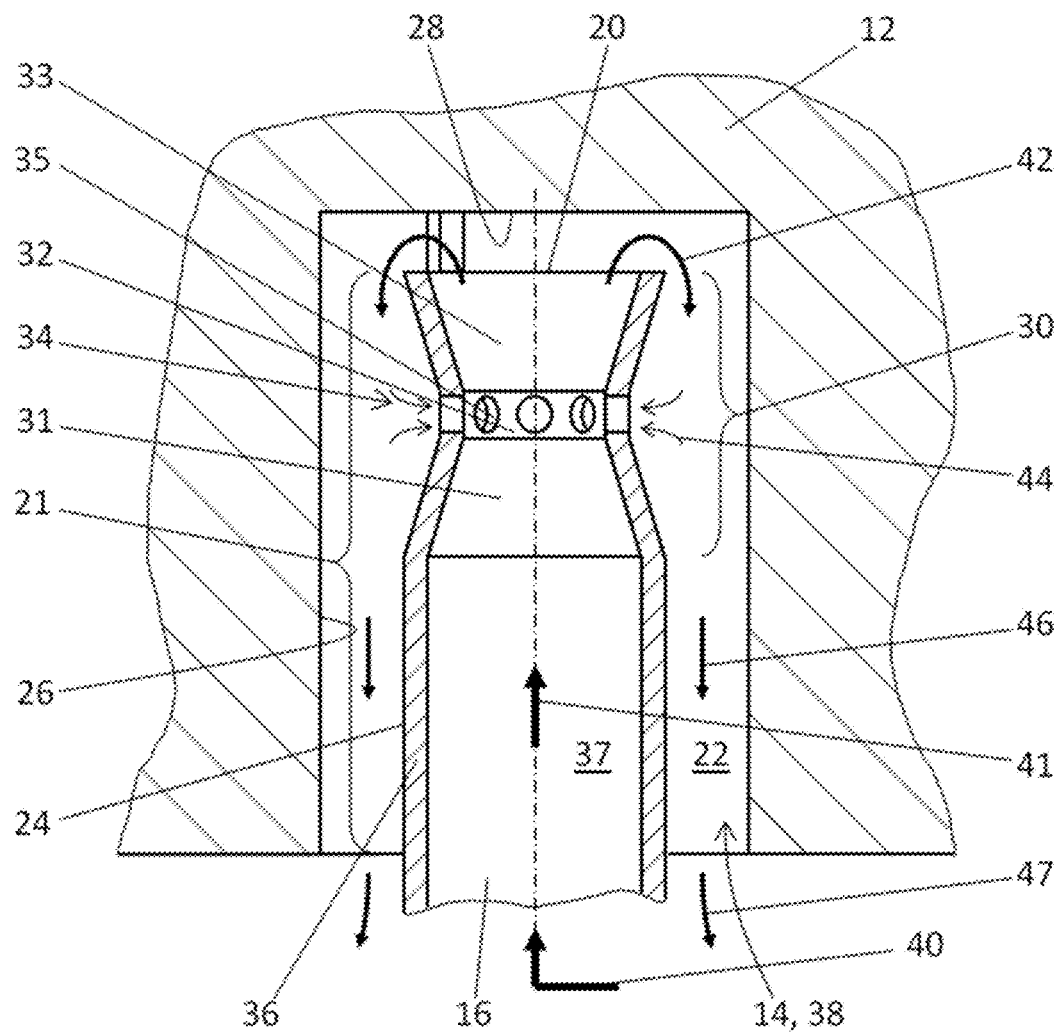
FIG. 3 shows a view of a detail of the system having a first embodiment of the pipe.

FIG. 3 shows an excerpt from the system according to the present disclosure, comprising the component 12 in cross section through a cavity 14, which is configured as a blind hole 38 and into which is introduced a pipe 16 by way of a pipe section 21 with the formation of the annular space 22 between an outer surface 24 of the pipe 16 and an inner surface 26 of the cavity 14. Component 12 may be, for example, an overflow wall 100 according to FIGS. 1A, 1B, a bridge wall 110 or a tank bottom 106' according to FIGS. 2A, 2B, or another tank component that is in contact with the glass melt. The arrangement in FIG. 3 is shown only schematically and not to scale. In particular, the length-to-diameter ratio of the blind borehole and the pipe 16 are not to scale. Usually, the blind hole 38 and the pipe 16 are deeper or longer in relation to their diameter than they are represented in the illustration of the drawing. The depth or length may vary considerably. These depend in turn on the thickness of the component that is to be penetrated or on the orientation of the cavity in the latter.

Figure 4:
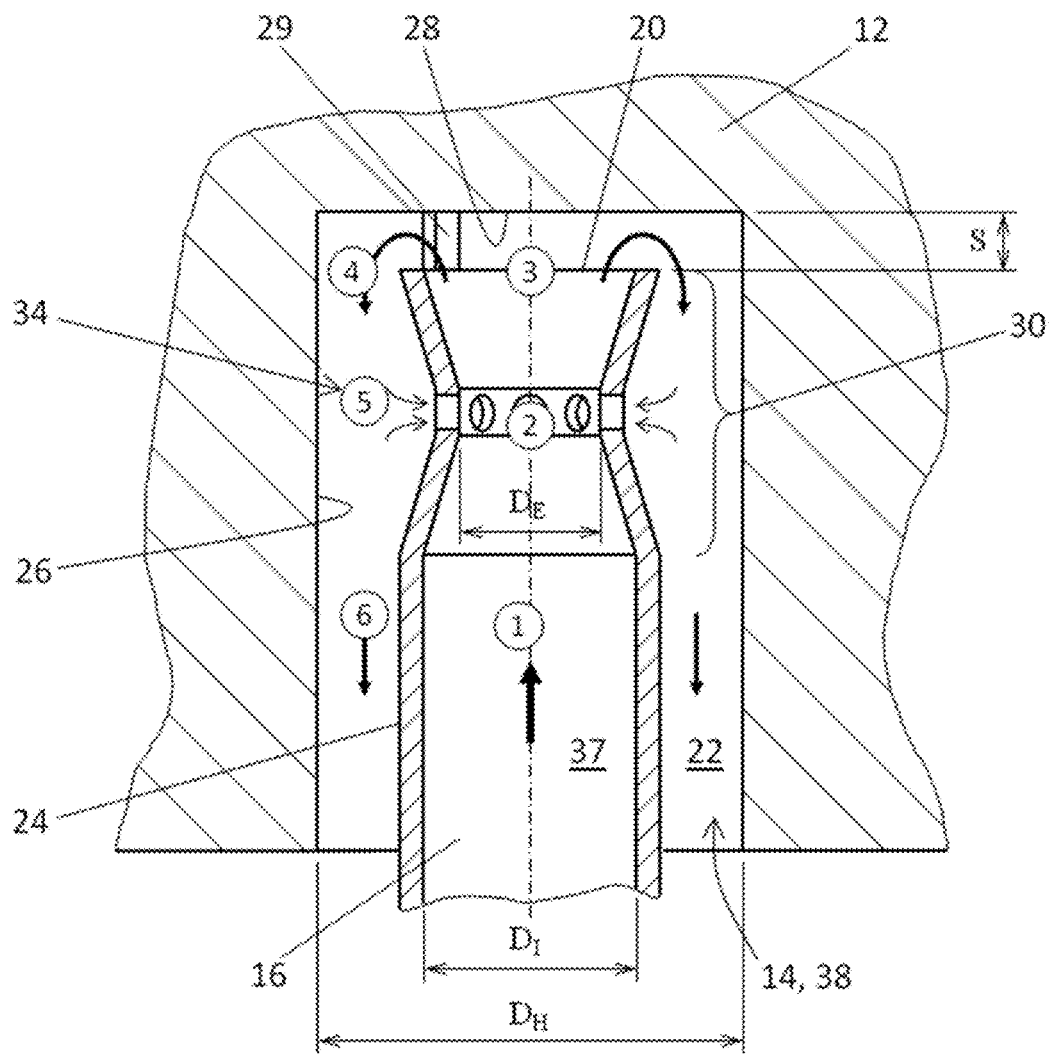
FIG. 4 shows the same view as FIG. 3 for explaining the pressure relationships in the pipe and in the cavity.

FIG. 4 shows the same view of the same arrangement as FIG. 3; it contains only additional technical data. Among other things, a distance S is depicted therein, which is maintained between pipe end 20 on the end side of the introduced pipe 16 and the base 28 of the cavity 14 or of the blind hole 38 on the end side. In order to assure in a simple way that the distance is maintained with the required precision, a spacer 29 is preferably provided between the pipe end 20 and the base 28 of the cavity 14 on the end side. More preferably, this spacer can be held in place by the pipe 16.

Adjacent to the pipe end 20, the pipe 16 has a peripheral constriction 30. The reference number 30 characterizes the entire region of the constriction 30, which is formed by a section 31 tapering in the flow direction, downstream of a cylindrical section 32 and an end section 33 widening in the flow direction further downstream. The directional data in this regard refer to the flow direction of the cooling medium inside pipe 16. With this geometry, the cylindrical section 32 forms the narrowest place 34 of the constriction 30. In the cylindrical section 32, the pipe 16 has perforations or boreholes 35 through the pipe walls 36, which fluidically connect the inside 37 of the pipe to the annular space 22.

In the following, the flow of air through the arrangement will be explained, which is characterized by arrows in the figures. The cooling medium (usually air) 40 that is introduced into the pipe 16 flows upward in the pipe in the axial direction, as is characterized by the arrow 41. Within the constriction 30, the flow rate of the air is increased based on the cross-sectional constriction, until it reaches its maximum at the narrowest place 34. At the same time, the stationary pressure within the pipe is minimal at this place. Up to the pipe end 20, the air has again attained the initial rate, since here the pipe diameter corresponds to the diameter of the rest of the pipe before the constriction 30. At the pipe end 20, the air exits on the end side and is deflected from the oppositelying base 28 of the blind hole 38, as arrows 42 illustrate. The air flows back in the annular space 22 and first passes through a widened region of the annular space 22, which coincides with the region of the constriction 30 and is designed to be complementary to this, since the pipe walls 36 are of equal thickness over the entire length of the pipe 16 and the cavity 14 is a cylindrical blind hole 38. In the widest region of the annular space 22, the flow of air further slows down, whereby the stationary pressure increases in the annular space until it reaches a maximum at the radially narrowest place 34 of the pipe 16, which is adjacent to the widest place of the annular space 22. Here, a difference in pressure arises between the inside 37 of the pipe and the annular space 22, which is responsible for the fact that a portion of the air flowing back from the annular space 22 is aspirated through the perforations or boreholes 35 into the inside 37 of the pipe, as indicated by the arrows 44. The circulated flow of air that is intensified in the region of the pipe end 20 leads to an increase in the local heat transfer coefficient and thus to a stronger cooling effect.

Furthermore, the air flows back again in the annular space 22, which is symbolized by the arrows 46, and flows out of the cavity at the lower end of the component 12, as the arrows 47 illustrate.

The pressure relationships inside and outside the pipe are qualitatively considered in the following, on the basis of FIG. 4. Since the exemplary embodiment involves the ideal case of a rotationally symmetric geometry, thus a pipe 16 and a blind hole 38 which are each present with circular-round cross sections, the calculations can be referred back directly to the real diameters indicated in the figure. If rotational symmetry were not present, instead of the real diameters, equivalent diameters D would be used, which can be calculated from the real cross-sectional surface areas A as $D = 2 \cdot \sqrt{A/\pi}$.

The pipe 16 is configured as cylindrical, except in the region of the constriction 30, and has an inner diameter $D_I$ in the cylindrical section. The blind hole has a diameter $D_H$. The most favorable relationship of the cross sections or diameters as a compromise between cooling power and pressure loss was found in a region $D_H = \sqrt{1.5} \cdot D_I$ to $2 \cdot D_I$ with an optimum at $D_H = \sqrt{2} \cdot D_I$. As described above, for the pressure loss, the matching of the hydraulic diameters of the pipe 16 and of the annular space 22 would be advantageous, and for the heat transfer, a flow rate in the annular gap 22 that is as high as possible would also be advantageous, but high preliminary pressures are associated therewith and thus high capital and operating costs. An approximate matching of the flow cross sections of the pipe 16 and of the annular space 22 has turned out to be advantageous. For circular cross sections, this describes the above optimum. while disregarding the wall thickness of the pipe.

The distance S between the pipe end 20 and the base 28 of the blind hole 38 advantageously is from $0.1 \cdot D_H$ to $0.8 \cdot D_H$, wherein under the assumption $D_H = \sqrt{2} \cdot D$ the optimum lies at approximately $S = 0.35 \cdot D_H$. These proportions have been demonstrated to be optimal, in particular with respect to a pressure loss that is as small as possible in the region of the flow deflection, thus between pipe end and blind-hole base. As stated above, the measurement results from the selection of similar flow cross sections in the region of the flow deflection. If the gap or distance S is selected too large, the heat transfer at the end surface area is poorer; if the gap is selected too narrow, the pressure loss increases and so does the required preliminary pressure, which drives up the costs of the cooling.

The following considerations are relevant for the dimensioning of the constriction 30: The circled points 1 to 6 depicted in FIG. 4 mark the places where the pressure values with corresponding indices that are drawn on in the following are assumed. p1 thus stands for the pressure at the position 1, etc. Pressure differences between two adjacent points are indicated with appropriate double indices. p12 accordingly stands for the pressure difference between point 1 and point 2, i.e., p12=p1−p2, etc. If a pressure loss is present from 1 to 2, then p12 is positive.

Thus, for the effect according to the present disclosure to occur at all, according to the above considerations, first the following must be valid:

$$p5 > p2.$$

This relation can also be represented by means of the pressure differences as:

$$p1 - p12 - p23 - p34 - p45 > p1 - p12$$

Equivalently rearranged, one obtains:

$$-p23 - p34 - p45 > 0.$$

In this case, p34 is the pressure loss from 3 to 4 based on the flow deflection. This can be determined empirically by tests or flow simulations and is also designated below as $A_p u$. Accordingly, the following is thus valid:

$$-p23-p45 > \Delta pu. \quad (1)$$

The pressure differences p23 and p45 can be converted to the following based on the Bernoulli equation:

$$p23 = p2 - p3 = \frac{\rho}{2} \cdot (v_3^2 - v_2^2) \quad (2)$$

or $$p45 = p4 - p5 = \frac{\rho}{2} \cdot (v_5^2 - v_4^2). \quad (3)$$

Here, $v_x$ designates the rate at the position x, which, as is known, is proportional to the volumetric flow $\dot{V}$ divided by the flow cross section $A_x$ at the corresponding position: $v_x = \dot{V}/A_x$. Here, if the latter is inserted in Eqs. (2) and (3) and this in turn is inserted in Eq. (1) and rewritten, the result is:

$$-\frac{1}{A_3^2} + \frac{1}{A_2^2} - \frac{1}{A_5^2} + \frac{1}{A_4^2} > \frac{2}{\dot{V}^2 \rho} \Delta pu. \quad (4)$$

This relation has general validity for the entire subject of the present disclosure and, in particular, for all preferred surface area relationships of $A_H = 1.5 \cdot A_I$ to $A_H = 4 \cdot A_I$ and permits determining, with given pipe cross section $A_I = A_3$, given cavity cross section $A_H = A_3 + A_4 + A_W$ and taking into consideration the wall thickness $A_W$ of the pipe at that axial position, the maximum cross-sectional surface area of the pipe at the narrowest position of the constriction $A_E = A_2$ or the minimum cross-sectional surface area of the annular space at the corresponding axial position $A_5$.

Relation (4) is always fulfilled for any small values of $A_E = A_2$, which also corresponds to theoretical expectations, yet the Bernoulli effect continually increases with the cross section $A_E$ becoming smaller. Of course, counter to this is the fact that any narrow constriction in practice is accompanied by a no longer tolerable pressure loss at any time over the entire flow path, since the cooling then could only still be driven with a very high initial pressure, and therefore would not be economical. For this reason, for practically relevant pressure relationships, a minimum cross-sectional surface area of the pipe at the narrowest position of the constriction can be indicated by $A_E = 0.04 \cdot A_I$ or a corresponding diameter ratio $D_E = 0.2 \cdot D_I$ as the lower limit.

In the exemplary embodiment with the geometric condition $A_H = 2 \cdot A_I$, Equation (4) is further simplified. The condition $A_H = 2 \cdot A_I$ rewritten to the indices 3 and 4 with $A_I = A_1 = A_3$ and with $A_H = A_3 + A_4$, neglecting the wall thickness of the pipe, simply means $A_3 = A_4$. This is inserted in Eq. (4) and rewritten for the indices E and H, and taking into consideration the wall thickness $A_{WE}$ of the pipe in the region of the narrowest constriction with $A_2 = A_E$ and $A_5 = A_H - A_E - A_{WE}$, one obtains:

$$\frac{1}{A_E^2} - \frac{1}{(A_H - A_E - A_{WE})^2} > \frac{2}{\dot{V}^2 \rho} \Delta pu. \quad (5)$$

For the pressure loss due to the deflection at the base of the cavity, in the case of the indicated geometric conditions including a setting depth $S = 0.35 \cdot D_H$, an estimate of a doubled 90° deflection of a pipe flow has been demonstrated to be sufficiently accurate, from which a value of 50 mbar results for the term $\Delta pu$. Thus, based on the relation (5), in this example, an estimate for the maximum cross section $A_E$ at the narrowest position 2 can be indicated.

All of the above considerations do not take into account dissipative effects and in this regard represent an approximation for the design of the constriction. However, they show the boundary conditions under which the basic principle operates. If one wishes to optimize the geometry of the constriction, i.e., to further increase the efficiency, then it is recommended that a flow simulation be carried out, which can take into consideration the real geometric parameters and also surface effects.

In the exemplary embodiment shown in FIGS. 3 and 4, the region of the constriction 30 is configured in such a way that the conically tapering region 31 and the conically widening region 33 are equally long and mirror-symmetrical in the axial direction. This geometry is just as compelling as very generally the proportions of the constriction, the course of the wall of the pipe, or, for example, the arrangement of the perforations. It is crucial that the geometry can give rise to a pressure difference of p5>p2 and thus the effect based thereon. Nevertheless, by a variation in the detail geometry of the pipe and/or of the cavity inside and outside the constricted region 30, such as, for example, that of the length of the constricted region 30' and/or that of one or both angles of inclination of the tapers or widenings, an optimizing of cooling power and pressure loss could be effected.

Figure 5:
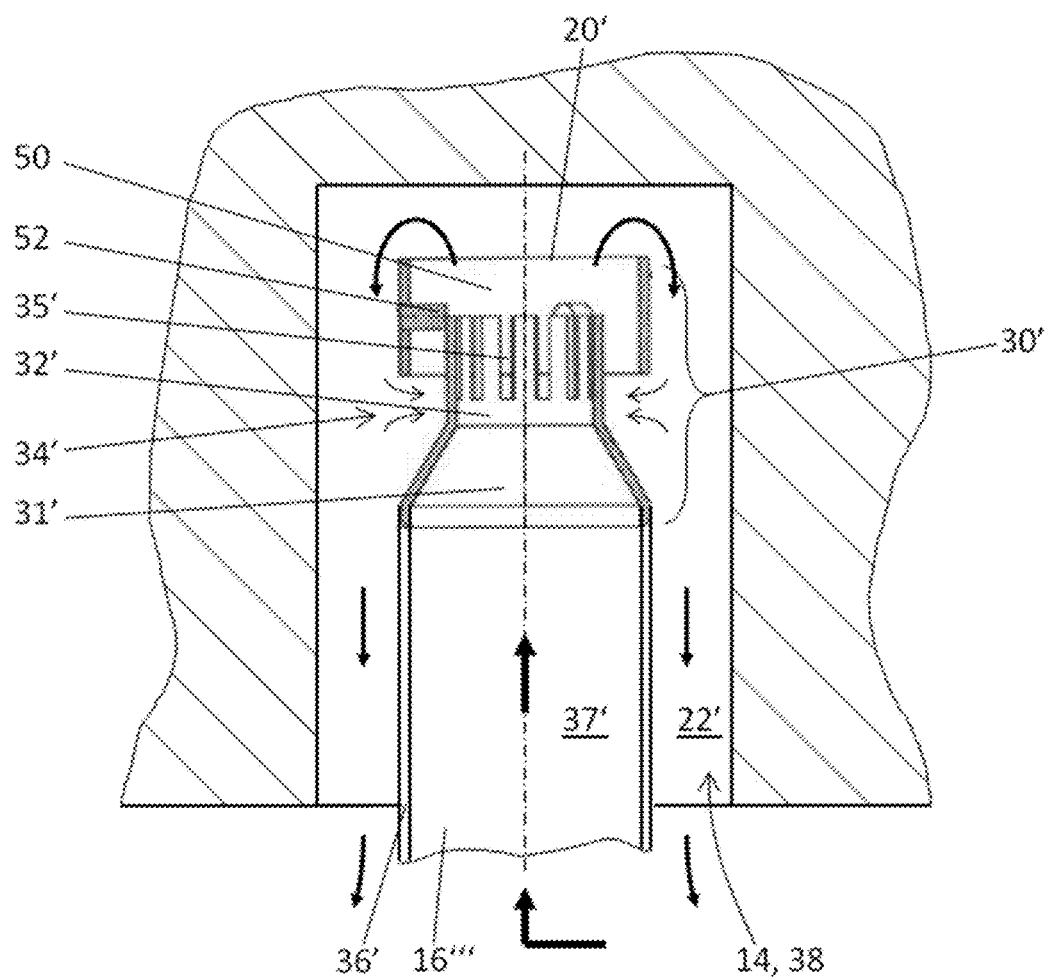
FIG. 5 shows a view of a detail of the system having a second embodiment of the pipe.

The width variation that will be given for the concrete configuration of the pipe shall be explained on the basis of FIG. 5, which is discussed in the following. This figure shows an alternative embodiment of the pipe 16''', which is differentiated from the pipe 16 of the configuration described with reference to FIGS. 3 and 4 by a modified region of the constriction 30'. This region 30' has a section 31' that tapers in the flow direction, subsequently a cylindrical section 32', and subsequently thereto an abruptly expanded cylindrical section 50, which again has the initial cross section of the pipe. The cylindrical section 32' forms the region of the narrowest constriction 34', in which the flow rate is again maximal and the stationary pressure is minimal. Slot-shaped perforations 35' through the walls 36' of the pipe 16''' that are oriented in the flow direction are provided in the cylindrical section 32'. In the transition to the cylindrical section 50, the flowing gas does not expand abruptly, but rather equally uniformly, as in the above-discussed exemplary embodiment. For this purpose, these slots are open further away at the front end of the cylindrical section 32'.

Only the part of the cylindrical section 32' that is not surrounded radially by the additional section 50 functionally forms the region of the narrowest constriction 34'. The slots begin in this region of the narrowest constriction 34' in the flow direction in front of the cylindrical section 50 and at the same time form here the perforations 35', through which the cooling medium can flow radially into the inside 37' of the pipe from the annular space 22' due to the stationary pressure difference, as described previously.

For purposes of mechanical fastening of the additional cylindrical section 50 to the narrower cylindrical section 32', several spacer elements 52 (three here) that join together the two sections 32' and 50 are arranged at a distance radially and are peripherally interposed therebetween.

Figure 6:
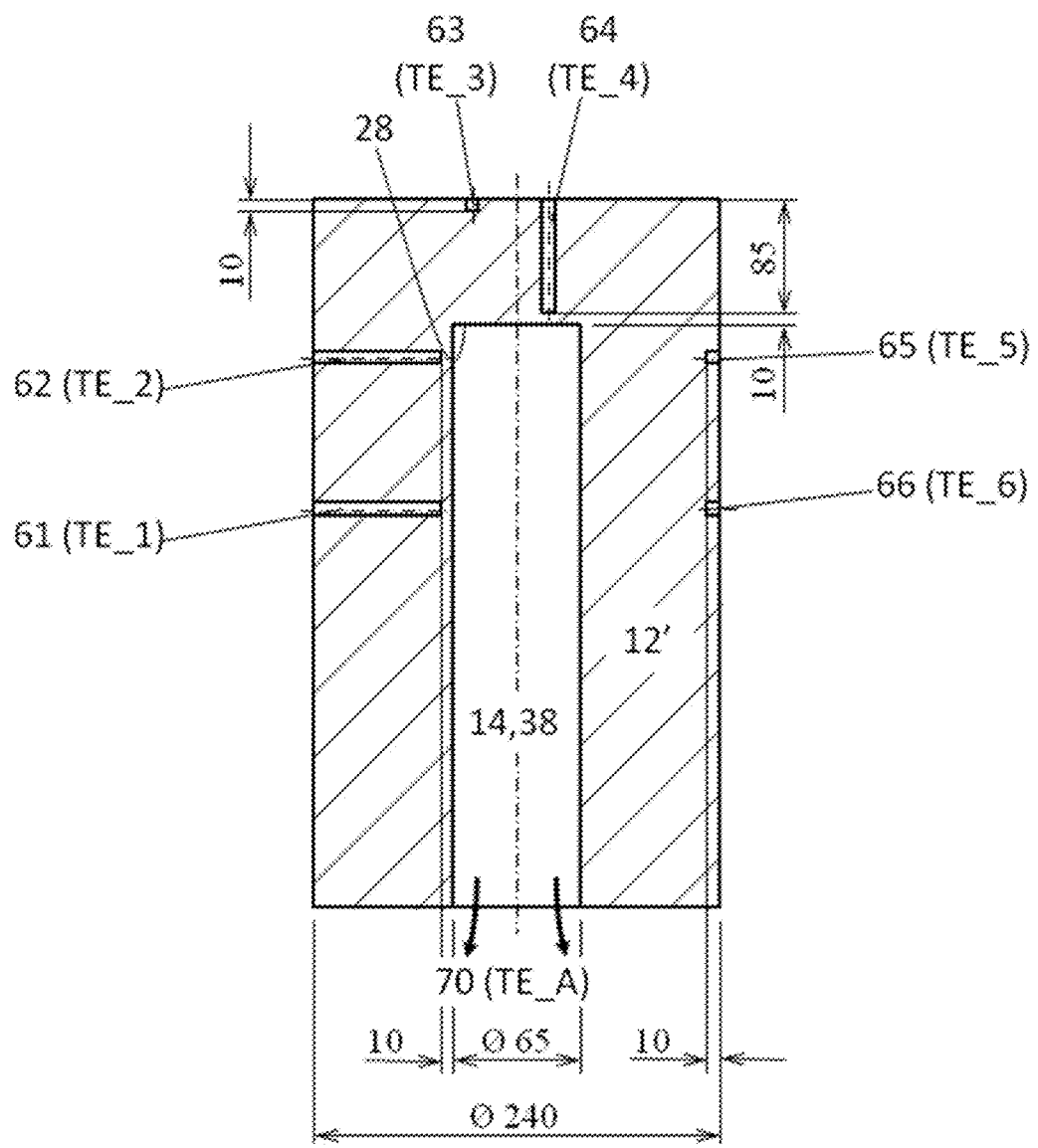
FIG. 6 shows a cross section through a test block for determining the cooling power.

FIG. 6 shows a sectional view of a test block 12', which has a cylindrical shape. Centrally, thus coinciding with the cylinder axis, a cavity 14 in the form of a blind hole 38 is found in the test block 12'. A plurality of measurement boreholes 61, 62, 63, 64, 65 and 66 are found both on the outer periphery as well as on the end side opposite the base 28 of the blind hole 38.

The test block has an outer diameter of 240 mm; the blind hole 38 has a diameter of 65 mm. The measurement boreholes 61, 62 and 64 are deep boreholes that are close to the blind hole 38, except for a distance of 10 mm in each case, and two of these are radial and one is axial. The measurement boreholes 63, 65 and 66 are surface boreholes, each of which only projects 10 mm from the outer side into the test block. Two of these are also arranged radially and one is on the end side. For the practical determination of the cooling power, a thermocouple was inserted into each of the test boreholes 61 to 66 for the temperature measurement. The thermocouples assigned to the test boreholes 61 to 66 bear designations in the same sequence: TE_1, TE_2, TE_3, TE_4, TE_5 and TE_6. Another thermocouple TE_A was arranged below the blind hole 38 at the position 70 for the measurement of the temperature of the exhaust air.

For purposes of the test operation, a pipe according to FIG. 3 was inserted from below into the blind hole 38 of the test block 12' and held centrally therein. The setting depth, i.e., the distance S between the upper end 20 of the pipe and the base 28 was freely adjustable and was varied during the tests. The pipe was connected to a blower and was acted on with varying volumetric flows of the cooling medium, air, during the tests.

For purposes of comparison, a straight cylindrical pipe without constriction, but otherwise with the same dimensions and geometry was used. This pipe is called a standard pipe in the following. It was inserted in the same way from below into the blind hole 38 of the test block 12', held centrally therein, and operated with the identical setting depths and volumetric flows.

All of the following diagrams contain measurements with both pipes, in each case for three different setting depths: 15 mm, 25 mm and 35 mm.

The furnace was held constant at 1480° C. during the test time. The pipe was provided with cooling air by a blower having a variable volumetric flow. In the diagrams discussed below, measurement values are reproduced with volumetric flows of the blower of 100 m$^3$/h, 150 m$^3$/h, 200 m$^3$/h and 250 m$^3$/h. The measured temperature values given in the following were determined after reaching a temperature equilibrium.

The results of the measurements with the pipe according to the present disclosure according to the representation in FIGS. 3 and 4 are denoted as "Venturi" in the legends of the diagrams discussed in the following. The comparative measurements with the pipe are denoted as "standard" in the legends of the diagrams. The setting depths are also indicated in the legends of the diagrams, with the numerical notation 15, 25 and 35 at the end.

Figure 7:
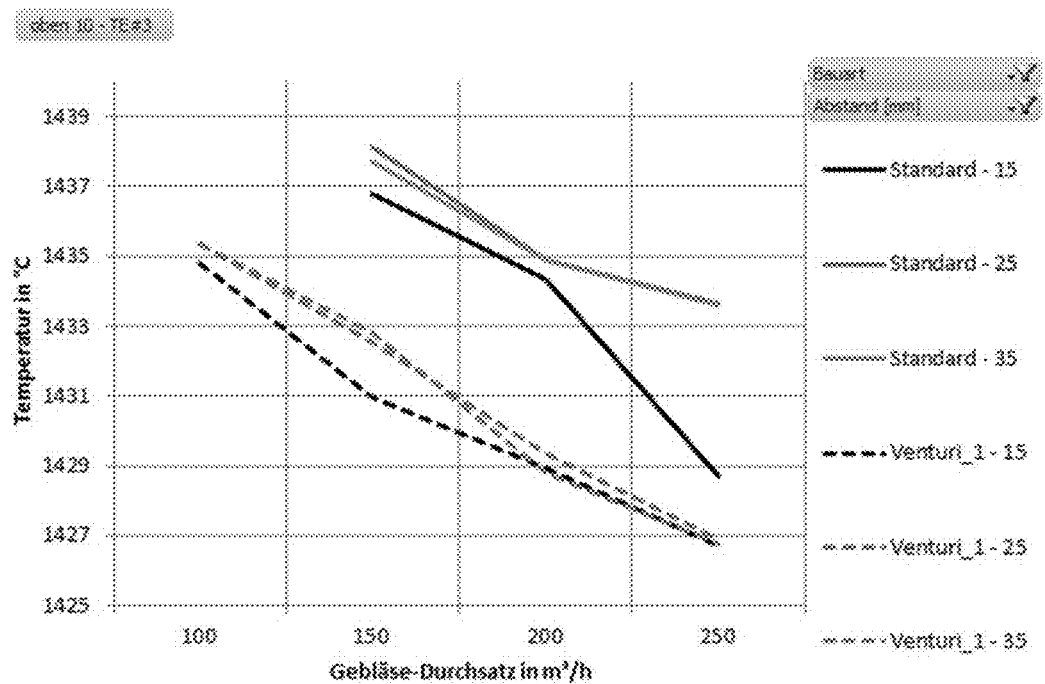
FIG. 7 shows a measurement plot of the temperature as a function of the blower throughput determined at a first position of the test block according to FIG. 6.

The diagram according to FIG. 7 reproduces the temperature curve in ° C. as a function of the blower throughput in m$^3$/h, measured by the thermocouple TE_3 in the surface borehole 63 on the end side of the test block 12'. This measurement point represents the temperature of the component next to the exposed end side that is subjected to the most wear.

From the curves of the diagram, it can be discerned that a cooling effect that increases both with increasing air throughput and decreasing setting depth can be obtained even with the standard pipe. Independent of the setting depth and the blower throughput, however, the cooling of the outer surface of the end side of the test block 12' is on average about 5° C. greater when it is brought about by the use of the pipe according to the present disclosure having a peripheral constriction when compared with the otherwise identical arrangement with the cylindrical standard pipe. At the same time, the principle of the constriction, unlike an additional reduction in the setting depth or increase in the air throughput, however, does not bring about an essentially additional pressure loss, and thus has a significantly improved efficiency. Since it is precisely at this place that the thermal and mechanical stresses of the component are the greatest, the cooling precisely contributes to the increase in the service life of the component.

Figure 8:
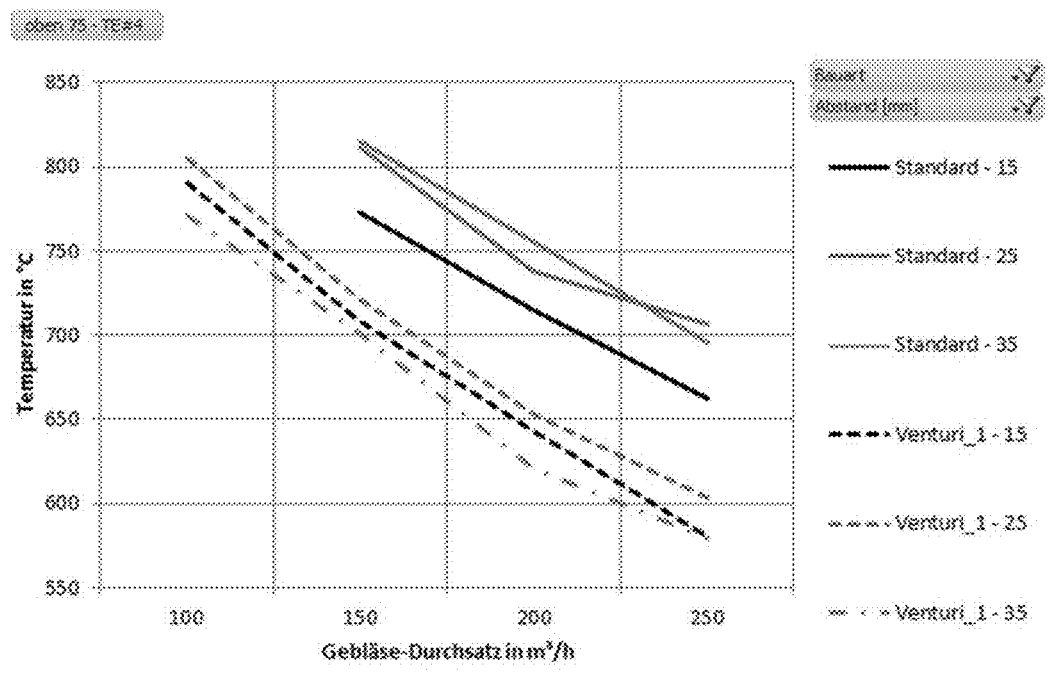
FIG. 8 shows a measurement plot of the temperature as a function of the blower throughput determined at a second place of the test block according to FIG. 6.

The diagram according to FIG. 8 reproduces the temperature curve in ° C. as a function of the blower throughput in m$^3$/h, measured by the thermocouple TE_4 in the deep borehole 64 on the end side of the test block 12'. This measurement point represents the temperature of the component near the cooling air flow inside the block. The measured temperature once again was approximately 50 to 75 Kelvin higher when the standard pipe was used, as compared to when the pipe according to the present disclosure was used, independent of the setting depth and the blower throughput. The diagram in FIG. 8 is thus suitable for confirming the finding from the previous diagram, wherein the absolute greater difference in temperature at this place, of course, is to be attributed to the fact that this measurement point is close to the flow of cooling air.

Figure 9:
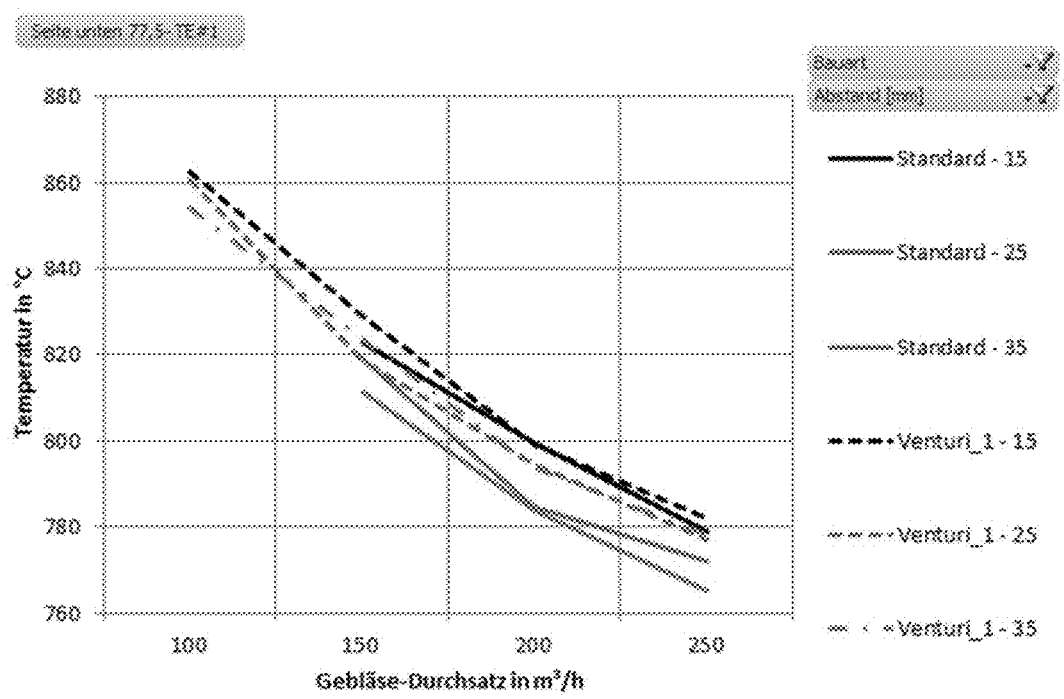
FIG. 9 shows a measurement plot of the temperature as a function of the blower throughput determined at a fourth place of the test block according to FIG. 6.

The diagram in FIG. 9 represents the temperature measurement in the deep measurement borehole 61 near the blind borehole 38 by means of the thermocouple TE_1. The measurement shows that at this measurement place that is the furthest down axially, a significantly improved cooling cannot be achieved with the use of the pipe according to the present disclosure. This confirms the assumption that an improved cooling occurs only in the region of the pipe end 20 or the base 28 of the blind hole, since an increased circulation of the cooling air is brought about there with the use of the pipe according to the present disclosure The cooling is therefore only increased locally where it is also required most in practice. This particularly confirms the effectiveness of the cooling according to the present disclosure.

Also, the temperature of the discharged air at the measurement point 70 was monitored by means of thermocouple TE_A, whereby it could be confirmed that an increased cooling resulted with the use of the pipe according to the present disclosure. The exhaust air temperatures when the pipe according to the present disclosure was used were found to be reproducibly greater than the exhaust air temperatures of the standard pipe with otherwise equal conditions, which can be concluded to be due to a greater removal of heat.

From all of the measurement data, it can be further discerned that a lesser setting depth is basically better with respect to the cooling power than a greater depth. This is valid in any case down to a certain minimum distance in which in reality, the pressure loss of the entire system begins to increase over-proportionally. If one considers the distances of the curves with different setting depths, it is seen that with the present system ($D_H$=65), a reduction from 35 mm to 25 mm can still cause a significant increase in the cooling power; however, a change to 15 mm no longer brings about this effect. A good compromise between removal of heat and pressure loss is accordingly a setting depth of <35 mm. If one wants to further increase the cooling power, taking into the bargain a higher pressure loss, a setting depth of <25 mm is to be preferred, but which then may make necessary an increased power of the blower under certain circumstances. Furthermore, it should be taken into consideration that tolerance deviations in the assembly and manufacture of the pipe and of the blind hole will be made more noticeable in the case of small setting depths.

While the present disclosure has been described with reference to one or more particular embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this disclosure.

LIST OF REFERENCE CHARACTERS

10 Glass melt
12 Component
12' Test block
13, 13' Glass melting plant
14, 14', 14" Cavity
16, 16', 16",16'" Pipe
17, 17' Supply line
18, 18' Flow generator/blower
20, 20' Open end of pipe
21 Pipe section that can be introduced/is introduced
22, 22' Annular space
24 Outer surface of the pipe
26 Inner surface of the cavity
28 Base of the cavity
29 Spacer
30, 30' Constriction
31, 31' Tapering section of the pipe
32, 32' Cylindrical section of the pipe
33 Widening section of the pipe
34, 34' Narrowest place of the constriction
35, 35' Perforation
36, 36' Pipe walls
37, 37' Inside of the pipe
38 Blind hole
40 Cooling medium
41 Flow arrow
42 Flow arrow
44 Flow arrow
46 Flow arrow
47 Flow arrow
50 Additional cylindrical section
52 Spacer element
54 Borehole
61-66 Measurement borehole
70 Temperature measurement point
100 Overflow wall
102, 102' Section of the melting tank
104, 104' Section of the melting tank
106, 106' Tank bottom
108 Side wall of the melting tank
110 Bridge wall
112 Side part
114 Side part
116 Cross beam
118 Window
S Setting measurement
$D_I$ Inner diameter of the pipe
$D_H$ Diameter of the blind hole
$D_E$ Diameter of the pipe at the narrowest place
TE_1-TE_6 Thermocouple
TE_A Thermocouple

What is claimed is:

1. A method for the cooling of a component of a glass melting plant that contacts a glass melt, the component having at least one open cavity, the method comprising the steps of:
    introducing a pipe with an open pipe end into the cavity in the component so that a peripheral annular space is formed between the outer surface of the pipe and the inner surface of the cavity, while maintaining an axial distance S between the pipe end and the base of the cavity; and
    during the operation of the glass melting plant, introducing a cooling medium through the pipe into the cavity so that it is deflected at the base of the cavity, flows back in the annular space, and flows out of the cavity, wherein, in its pipe segment introduced into the cavity, the pipe has a constriction, and in a region of the constriction has perforations through the pipe walls, whereby the cooling medium is accelerated in its passage through the constriction in the inside of the pipe, and a portion of the cooling medium flowing back from the annular space is aspirated into the inside of the pipe.

2. The method according to claim 1, wherein, except in the region of the constriction, the pipe has an internal cross-sectional surface area $A_I$ and the cavity has a cross-sectional surface area $A_H$ perpendicular to the pipe, wherein $A_H$ corresponds to 1.5 times to 4 times $A_I$.

3. The method according to claim 1, wherein, except in the region of the constriction, the pipe has an internal cross-sectional surface area $A_I$ and has an internal cross-sectional surface area $A_E$ at the narrowest place of the constriction, wherein the following condition is fulfilled: $A_E \geq 0.04 \cdot A_I$.

4. The method according to claim 3, wherein the pipe has a circular cross section with a diameter $D_E = 2 \cdot \sqrt{A_E/\pi}$ at the narrowest place of the constriction.

5. The method according to claim 1, wherein the cavity has a cross-sectional surface area $A_H$ perpendicular to the pipe and a diameter $D_H = 2 \cdot \sqrt{A_H/\pi}$, and in that the distance S corresponds to 0.1 times to 0.8 times the cavity diameter $D_H$.

6. The method according to claim 1, wherein the cavity is formed by a blind hole.

7. The method according to claim 6, wherein, except in the region of the constriction, the pipe is configured cylindrically, at least in sections, and has an inner diameter $D_I$ in the cylindrical section, in that the blind hole has a diameter $D_H$, and in that the following applies: $D_H = \sqrt{1.5} \cdot D_I$ to $2 \cdot D_I$.

* * * * *